UNITED STATES PATENT OFFICE.

JOSEPH J. BARTLETT, OF NEW YORK, N. Y.

IMPROVEMENT IN THE MANUFACTURE OF ARTIFICIAL STONE.

Specification forming part of Letters Patent No. 155,176, dated September 22, 1874; application filed March 13, 1874.

*To all whom it may concern:*

Be it known that I, JOSEPH J. BARTLETT, of the city, county, and State of New York, have invented a new and useful Improvement in the Manufacture of Artificial Stone; and I do hereby declare the following to be a full, clear, and exact description thereof, which will enable those skilled in the art to make and use the same.

This invention relates to an improvement on the artificial stone which I have described in my patent No. 140,239, dated June 24, 1873, and which consists of asbestus mixed with alkaline silicates and treated with muriatic acid. My present improvement relates to a compound of asbestus, hydraulic cement, and plaster of paris; which is formed in the required shape, and then dipped into a solution of alkaline silicates, and finally treated with a solution of muriatic or sulphuric acid.

In carrying out this invention, I take asbestus, eight parts; hydraulic cement, two parts; plaster of paris, one part; and mix with a sufficient quantity of water to produce a plastic compound. The plaster of paris is added with the view to cause the compound to set quick, but in some cases the plaster of paris may be omitted.

When the mixture has been shaped, it is permitted to set; and when it has become sufficiently dry I immerse it in a bath of silicate of soda, which fills the pores of the block, sheet, or slab, or other form, giving to the whole a density and strength that cannot otherwise be attained. Finally, in order to render the material water-proof, I bathe it again in a solution of muriatic or sulphuric acid, and then wash out with water.

If the alkaline silicates are mixed with the asbestus previous to the molding or shaping the compound, the mixture is difficult to shape, because under the influence of alkaline silicates it becomes adhesive and hardens very slowly. I have therefore adopted the plan above described, and by dipping the compound after it has been shaped in a solution of alkaline silicates, and then in a bath of muriatic or sulphuric acid, I am enabled to produce a tough and water-proof compound, which can be used with advantage for building-blocks, for ceilings, lathing, shelving, doors, shutters, trimmings; also, for cornices and similar purposes to take the place of galvanized sheet-iron; also, for roofing and floor tiles, slates, and slabs, to be used alone or to be applied to sheets of wire-cloth, or sheets made of hoop, bar, or pipe iron, or frames or net-work of either or all; all iron to be covered in whole or in part with the artificial stones; also, studs, beams, rafters, and purlins manufactured in the same manner.

What I claim as new, and desire to secure by Letters Patent, is—

A compound obtained by mixing asbestus with hydraulic cement, which, after having been shaped, is treated with alkaline silicates and with muriatic or sulphuric acid, substantially in the manner herein set forth.

JOS. J. BARTLETT.

Witnesses:
W. HAUFF,
E. F. KASTENHUBER.